(12) United States Patent
Futamura (10) Patent No.: US 8,344,711 B2
(45) Date of Patent: Jan. 1, 2013

(54) POWER SUPPLY DEVICE, CONTROL CIRCUIT AND METHOD FOR CONTROLLING POWER SUPPLY DEVICE

(75) Inventor: Kazuyoshi Futamura, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 369 days.

(21) Appl. No.: 12/762,668

(22) Filed: Apr. 19, 2010

(65) Prior Publication Data

US 2010/0283440 A1    Nov. 11, 2010

(30) Foreign Application Priority Data

May 8, 2009    (JP) .................................. 2009-113915

(51) Int. Cl.
 *G05F 1/00* (2006.01)
(52) U.S. Cl. ........................ 323/224; 323/283
(58) Field of Classification Search .................. 323/224, 323/283, 285
 See application file for complete search history.

(56) References Cited

U.S. PATENT DOCUMENTS

| 7,321,222 B2* | 1/2008 | Hojo .............................. 323/224 |
| 7,714,547 B2* | 5/2010 | Fogg et al. .................... 323/224 |
| 8,154,267 B2* | 4/2012 | Noda ............................ 323/285 |
| 2007/0120547 A1 | 5/2007 | Tateishi et al. | |

* cited by examiner

*Primary Examiner* — Shawn Riley
(74) *Attorney, Agent, or Firm* — Arnet Fox LLP (57) ABSTRACT

A power supply device including a converter having a switch circuit to which an input voltage is supplied and a coil coupled between the switch circuit and an output end from which an output voltage is output; and a control circuit comparing between a feedback voltage and a reference voltage, and on/off controls the switch circuit according to a comparison result; wherein, the control circuit includes a current gradient detection circuit performs detection of a gradient of a coil current flows thorough the coil during an off period of the switch circuit and generates a slope voltage according to a result of the detection; and an adder circuit performs one of generating the feedback voltage by adding the slope voltage to a voltage according to the output voltage and generating the reference voltage by adding the slope voltage to a standard voltage that is set according to the output voltage.

7 Claims, 8 Drawing Sheets

RELATED ART

POWER SUPPLY DEVICE, CONTROL CIRCUIT AND METHOD FOR CONTROLLING POWER SUPPLY DEVICE

CROSS-REFERENCE TO RELATED APPLICATIONS

This application is based upon and claims the benefit of priority from the prior Japanese Patent Application No. 2009-113915 filed on May 8, 2009, the entire contents of which are incorporated herein by reference.

FIELD

The present disclosure relates to a power supply device, a control circuit and a method for controlling the power supply device.

BACKGROUND

As a power supply device that generates an output voltage higher than or lower than an input voltage, a comparator type direct-current to direct-current (DC-DC) converter is known according to U.S. published patent application No. 2007/0120547. For example, a step-down DC-DC converter on/off controls a switch circuit to which an input voltage is supplied and a current that flows through a coil coupled to the switch circuit is smoothed by a smoothing capacitor to generate an output voltage. The output voltage generated in the above described manner includes a ripple voltage (ripple component) caused by the coil current and equivalent series resistance (ESR) of the smoothing capacitor. Thus, the DC-DC converter compares the output voltage and a given standard voltage and turns on the switch circuit when the output voltage becomes lower than the standard voltage due to the ripple component, and thereby controls the output voltage.

As described above, the DC-DC converter that generates an output voltage by switching the switching circuit demands stabilization of the output voltage, in other words, an output voltage with fewer ripple components. In order to meet the demand, DC-DC converters that use a smoothing capacitor with small ESR have been developed.

Figure 8:
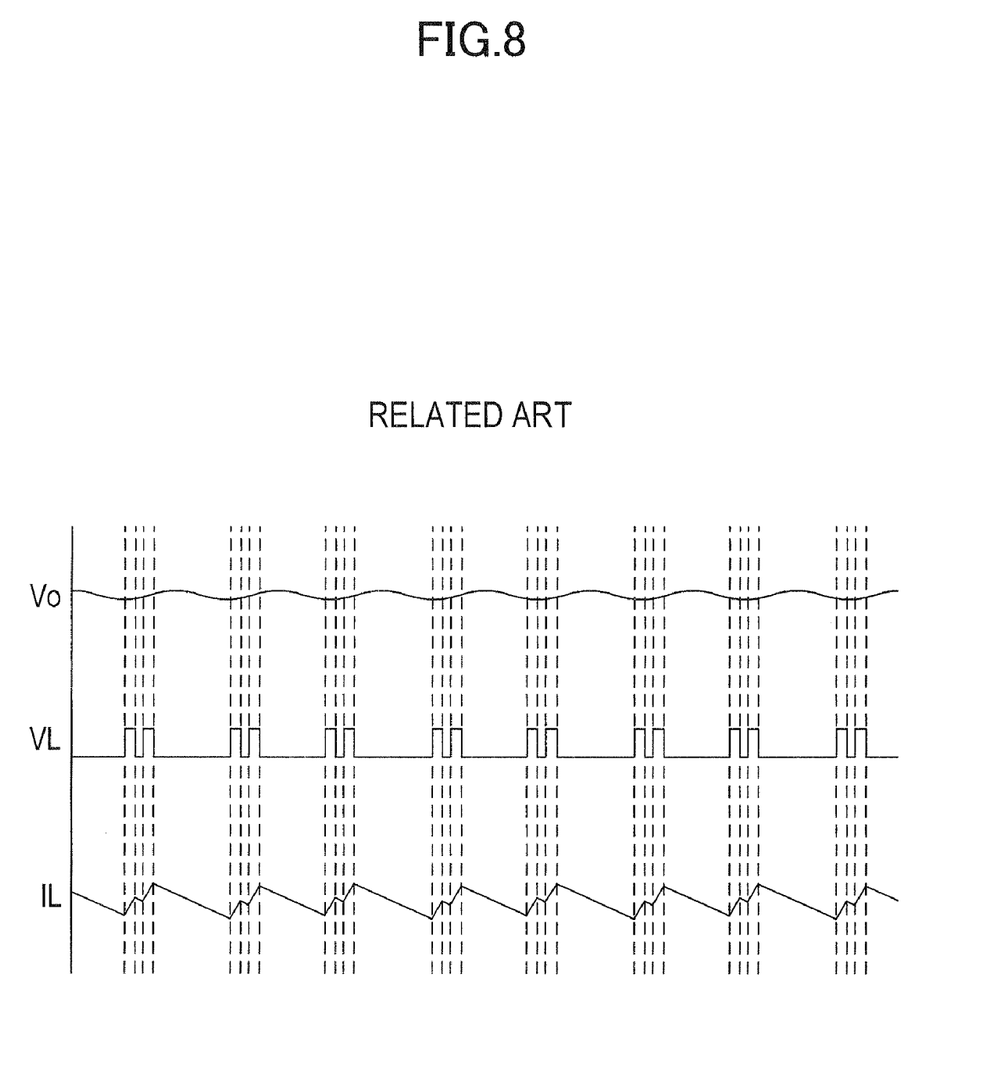
FIG. 8 is a waveform illustrating an operation of a conventional DC-DC converter.

However, a feed back system and a control cycle of a switch circuit become unstable when a value of ESR of a smoothing capacitor is made small. As a result, there is a drawback in that a voltage VL is irregularly applied to a coil and a current IL that flows through the coil changes irregularly, and thereby an output voltage Vo fluctuates as illustrated in FIG. 8.

SUMMARY

According to aspects of embodiments, a power supply device includes a converter unit that includes a switch circuit to which an input voltage is supplied and a coil that is coupled between the switch circuit and an output end from which an output voltage is output; and a control circuit that performs a comparison between a feedback voltage and a reference voltage, and on/off controls the switch circuit according to a result of the comparison; wherein, the control circuit includes a current gradient detection circuit that performs detection of a gradient of a coil current that flows thorough the coil during an off period of the switch circuit and generates a slope voltage according to a result of the detection; and an adder circuit that performs one of generating the feedback voltage by adding the slope voltage to a voltage according to the output voltage and generating the reference voltage by adding the slope voltage to a standard voltage that is set according to the output voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments will be explained with reference to accompanying drawings.

Hereunder, one embodiment in accordance with aspects of the present invention will be described by referring to FIGS. 1 to 5.

Figure 1:
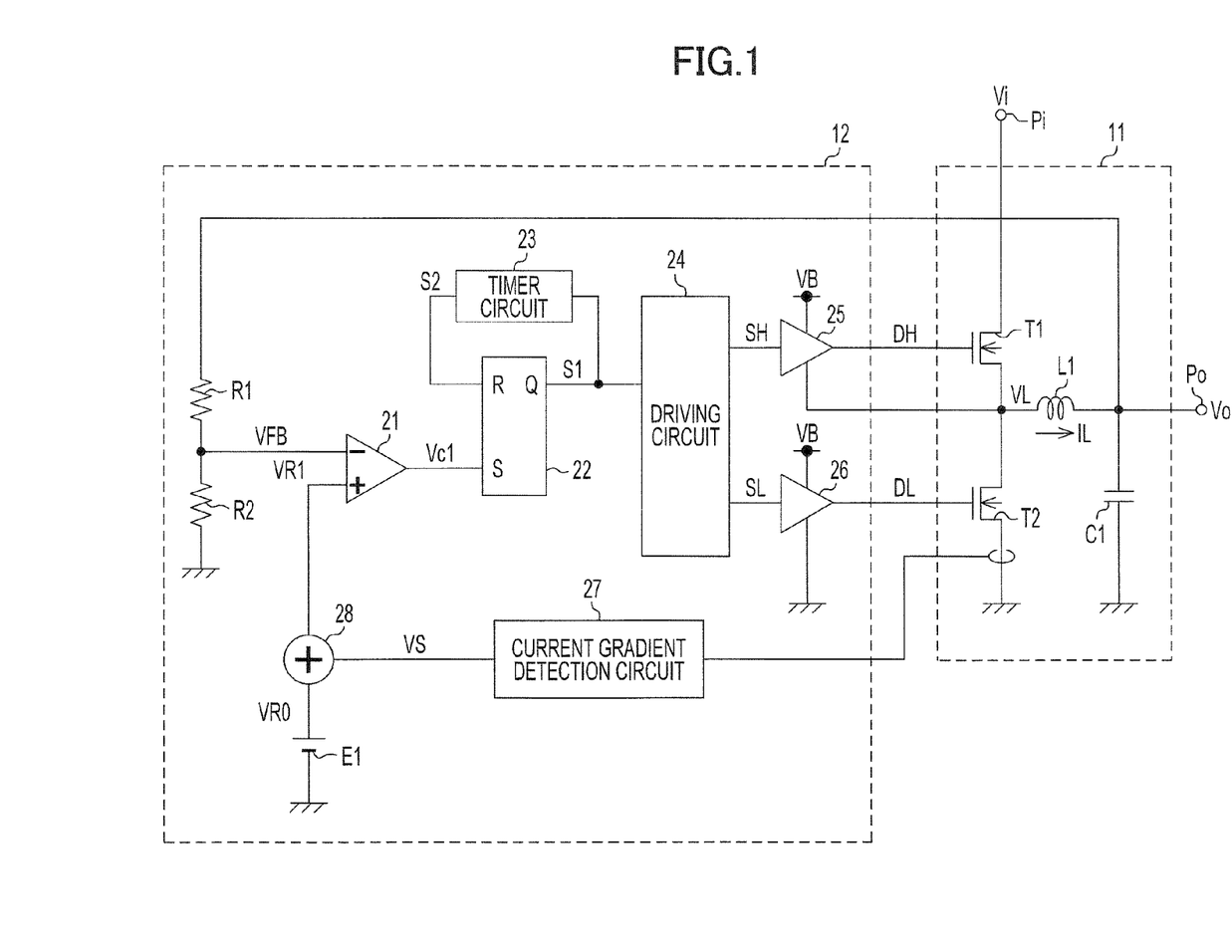
FIG. 1 is a block circuit diagram of a DC-DC converter according to one embodiment in accordance with aspects of the present invention.

As illustrated in FIG. 1, a DC-DC converter may include a converter unit 11 that generates an output voltage Vo based on an input voltage Vi, and a control circuit 12 that controls the converter unit 11 based on the output voltage Vo.

The converter unit 11 may include a transistor T1, a transistor T2, a coil L1, and a capacitor C1. The transistor T1 on a main side and a coil L1 are serially coupled between an input terminal Pi to which an input voltage Vi is supplied and an output terminal Po from which an output voltage Vo is output. Moreover, the transistor T1 on the main side and the transistor T2 on a synchronization side are serially coupled between the input terminal Pi and a power line for supplying a voltage lower than the input voltage Vi.

The transistor T1 on the main side and the transistor T2 on the synchronization side may be N-channel MOS transistors. A first terminal (drain) of the transistor T1 is coupled to the input terminal Pi to which the input voltage Vi is supplied and a second terminal (source) of the transistor T2 is coupled to a second terminal (drain) of the transistor T2, and a first terminal (source) of the transistor T2 is coupled to the power line (a ground according to the embodiment) a potential of which is lower than the input voltage Vi. The control circuit 12 supplies a control signal DH to a control terminal (gate) of the transistor T1, and supplies a control signal DL to a control terminal (gate) of the transistor T2.

The transistor T1 turns on and off in response to a control signal DH. The transistor T2 turns on and off in response to a control signal DL. The control circuit 12 generates the control signals DH and DL so that the transistor T1 on the main side and the transistor T2 on the synchronization side complementarily turn on and off. In other words, the transistors T1 and T2 are one example of a switch circuit. The control circuit 12 may include a switch control circuit that turns on and off the transistor T1 that provides functions as a switch circuit.

A coupling point between the transistors T1 and T2 is coupled to a first terminal (an input side terminal) of the coil L1, and a second terminal of the coil L1 is coupled to the output terminal Po. Moreover, a second terminal (an output side terminal) of the coil L1 is coupled to a first terminal of the smoothing capacitor C1 and a second terminal of the capacitor C1 is coupled to a ground. The capacitor C1 may be included in a smoothing circuit that smoothes an output voltage Vo.

When the transistor T1 on the main side turns on and the transistor T2 on the synchronization side turns off, a coil current IL according to a difference between an input voltage Vi and an output voltage Vo flows through the coil L1 and the energy (electric power) is accumulated in the coil L1. When the transistor T1 on the main side turns off and the transistor T2 on the synchronization side turns on, the coil L1 discharges the accumulated energy and an inducted current (coil current IL) flows through the coil L1. The control circuit 12 adjusts a pulse width of control signals DH and DL based on the fed back output voltage Vo.

Hereunder, a configuration of the control circuit according to aspects of the embodiment will be described.

The control circuit 12 may include a comparator 21, an RS-flip flop circuit (RS-FF circuit) 22, a timer circuit 23, a driving circuit 24, driver circuit 25, a driver circuit 26, a current gradient detection circuit 27, an adder circuit 28, a resistor R1, a resistor R2, and a standard power supply E1.

A voltage based on the output voltage Vo is supplied to an inverting input terminal of the comparator 21. According to aspects of the embodiment, a voltage generated by the resistors R1 and R2 is supplied. The output voltage Vo is fed back to a first terminal of the resistor R1 and a second terminal of the resistor R1 is coupled to a first terminal of the resistor R2, and a second terminal of the resistor R2 is coupled to a ground. A coupling point between resistor R1 and resistor R2 is coupled to an inverting input terminal of the comparator 21. The resistor R1 and the resistor R2 generate a voltage (divided voltage, feedback voltage) VFB that is obtained by dividing the output voltage Vo according to respective resistance values. The value of the feedback voltage VFB corresponds to a ratio of the resistance value of resistor R1 to that of resistor R2, and a potential between the output voltage Vo and the ground. Hence, the resistors R1 and R2 may generate a feedback voltage VFB that is proportional to the output voltage Vo.

A reference voltage VR1 is supplied to a non-inverting input terminal of the comparator 21. The comparator 21 compares the feedback voltage VFB with the reference voltage VR1, and generates a signal Vc1 according to the comparison result. In the embodiment, the comparator 21 generates an H level signal Vc1 when the feedback voltage VFB is lower than the reference voltage VR1, and generates an L level signal Vc1 when the feedback voltage VFB is higher than the reference voltage VR1. The signal Vc1 is supplied to the RS-FF circuit 22.

A signal Vc1 is supplied to a set terminal of the RS-FF circuit 22 and a signal S2 is supplied to a reset terminal of the RS-FF circuit 22. The RS-FF circuit 22 outputs an H level signal S1 in response to an H level signal Vc1, and outputs an L level signal S1 in response to an H level signal S2. In other words, for the RS-FF circuit 22, the signal Vc1 may be a set signal, while the signal S2 may be a reset signal. The signals S1 output from the RS-FF circuit 22 is supplied to the timer circuit 23 and the driving circuit 24.

The timer circuit 23 outputs an H level pulse signal S2 in response to an H level signal S1 after a given time elapses from a rising timing of the signal S1. The given time may be a time that depends on an input voltage Vi and an output voltage Vo. In other words, the timer circuit 23 outputs an H level pulse signal S2 after a given time elapses depending on the input voltage Vi and the output voltage Vo from the rising timing of the signal S1. The above described RS-FF circuit 22 outputs an L level signal S1 in response to an H level signal S2. As a result, the signal S1 output from the RS-FF circuit 22 becomes an H level during a period that depends on the input voltage Vi and the output voltage Vo. In other words, the timer circuit 23 may determine a pulse width of the signal S1 output from the RS-FF circuit 22.

An example of a timer circuit 23 will be described by referring to FIG. 2.

Figure 2:
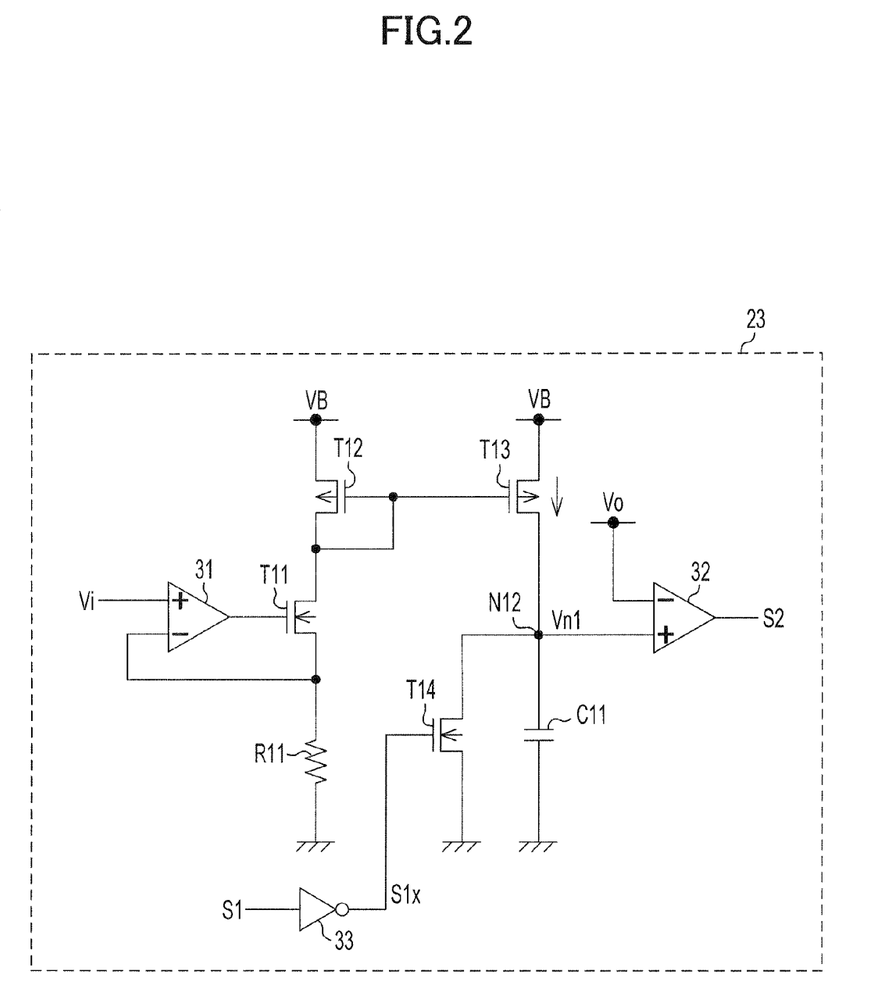
FIG. 2 is a circuit diagram of a timer circuit in accordance with aspects of the present invention.

As illustrated in FIG. 2, the timer circuit 23 may include an operational amplifier 31 and an operational amplifier 32, an inverter circuit 33, a capacitor C11, a resistor R11, and transistors T11 to T14.

An input voltage Vi is supplied to a non-inverting input terminal of the operational amplifier 31. An inverting input terminal of the operational amplifier 31 is coupled to a first terminal of the resistor R11, and a second terminal of the resistor R11 is coupled to a ground. Moreover, a first terminal of the resistor R11 is coupled to the transistor T11. The transistor T11 may be an N-channel MOS transistor, having a source coupled to the resistor R11, a gate coupled to an output terminal of the operational amplifier 31, and a drain coupled to the transistor T12.

A potential difference according to a current that flows through the resistor R11 and a resistance value is caused between both terminals of the resistor R11. The operational amplifier 31 generates a gate voltage of the transistor T11 so that a potential of a node between the resistor R11 and the transistor T11 becomes substantially the same as the input voltage Vi. Thus, a current according to the input voltage Vi may flow through the transistor T11.

The transistor T12 may be a P-channel MOS transistor, having a source supplied with a bias voltage VB, a drain coupled to the transistor T11, and a gate coupled to a drain of the transistor T12 and a gate of the transistor T13. The transistor T13 may be a type of a MOS transistor which is substantially the same as that of the transistor T12, and a source of which is supplied with a bias voltage VB. Accordingly, the transistor T12 and the transistor T13 may be included in a current mirror circuit. The current mirror circuit may flow a current to the transistor T13 that is proportional to a current that flows through the transistor T11 according to electrical characteristics of the both transistors T12 and T13.

A drain of the transistor T13 is coupled to a first terminal of the capacitor C11 and the transistor T14, and a second terminal of the capacitor C11 is coupled to a ground. The transistor T14 is an N-channel MOS transistor having a source coupled to a ground and a drain coupled to the transistor T13, in other words, the first terminal of the capacitor C11. In other words, the transistor T14 may be coupled in parallel with the capacitor C11.

A signal S1x that is obtained by logically inverting the signal S1 by the inverter circuit 33 is supplied to a gate of the transistor T14. The signal S1 may be a signal output from the RS-FF circuit 22 illustrated in FIG. 1, and the transistor T11 on the main side is turned on when a signal S1 is an H level, while the transistor T11 on the main side1 is turned off when a signal S1 is an L level.

On the other hand, the transistor T14 turns on when the signal S1x is an H level, in other words, a signal S1 is an L level, and turns off when the signal S1x is an L level (the signal S1 is an H level). The transistor T13 supplies a current depending on an input voltage Vi to the capacitor C11. The turned on transistor T14 couples both terminals of the capacitor C11 each other, and thereby the first terminal of the capacitor 11 may become a ground level. When the transistor T14 is turned off, the capacitor C11 is charged by a current supplied from the transistor T13. As a result, a level of the first terminal of the capacitor C11 may rise from the ground level depending on the input voltage Vi.

In other words, the timer circuit 23 short-circuits the both terminals of the capacitor C11 when the transistor T1 on the main side illustrated in FIG. 1 is turned off, and resets a voltage Vn1 of a node N12 to a ground level. Charging of the capacitor C11 starts when the transistor T1 is turned on. Consequently, the voltage Vn1 of the node N12 may rise depending on an input voltage Vi.

The node N 12 is coupled to a non-inverting input terminal of the operational amplifier 32, and an output voltage Vo is supplied to an inverting terminal of the operational amplifier 32. The operational amplifier 32 compares a voltage Vn1 of the node N12 with an output voltage Vo and outputs a signal S2 according to the comparison result. As described above, the voltage Vn1 of the node N12 changes according to the input voltage Vi. The operational amplifier 32 outputs an L level signal S2 when the voltage Vn1 is lower than the output voltage Vo, and outputs an H level signal S2 when the voltage Vn1 is higher than the output voltage Vo. The voltage Vn1 rises when the transistor T1 on the main side is turned on. Accordingly, a period from when the transistor T1 is turned on to when an H level signal S2 is output may depend on the input voltage Vi and the output voltage Vo.

A current for charging the capacitor C11, in other words, a current that flows through the transistor T11, is proportional to the input voltage Vi. As a result, a period from when the transistor T1 is turned on to when the H level signal S2 is output is inversely proportional to the input voltage Vi. A period from when the transistor T1 is turned on to when the H level signal S2 is output is proportional to the output voltage Vo, because the operational amplifier 32 compares the voltage Vn1 with the output voltage Vo. In other words, a period in which the transistor turns on (on-period) may inversely proportional to the input voltage Vi, and proportional to the output voltage Vo. A period in which the transistor turns off (off-period) may be inversely proportional to the output voltage Vo. Hence, the control circuit 12 may control a switching frequency so as to be substantially constant.

As illustrated in FIG. 1, the driving circuit 24 generates control signals SH and SL so that transistors T1 and T2 complementarily turn on and off based on the signal S1. Dead times may be set in the control signals SH and SL so as not to turn on both transistors T1 and T2 substantially simultaneously. In the driver circuit 25, a bias voltage VB is supplied to a power supply terminal of a high potential side and a power supply terminal of a low potential side is coupled to a node between the transistors T1 and T2 of the converter unit 11. The driver circuit 25 outputs a control signal DH in response to a control signal SH. In the driver circuit 26, a bias voltage VB is supplied to a power supply terminal of a high potential side and a power supply terminal of a low potential side is coupled to a ground. The driver circuit 26 outputs a control signal DL in response to a control signal SL.

According to aspects of the embodiment, the driver circuit 24 may output an H level signal SH and an L level signal SL in response to an H level signal S1, and output an L level signal SH and an H level signal SL in response to an L level signal S1. The transistor T1 on the main side may turn on in response to a control signal DH based on an H level signal SH, and turn off in response to a control signal DH based on an L level signal SH. Similarly, the transistor T2 on the synchronization side may turn on in response to a control signal DL based on an H level signal SL, and turn off in response to a control signal DL based on an L level signal SL.

The above described comparator 21 outputs an H level signal Vc1 when the output voltage Vo becomes lower than the reference voltage VR1, and the RS-FF circuit 22 outputs an H level signal S1 in response to the signal Vc1. The timer circuit 23 outputs an H level signal S2 after a given time elapses from the output of the H level signal S1, and the RS-FF circuit 22 outputs an L level signal S1 in response to the signal S2. The driver circuit 24 outputs control signals SH and SL for turning on and off the transistors T1 and T2 in response to the signal S1.

Thus, the control circuit 12 may turn on the transistor T1 on the main side when the output voltage Vo becomes lower than the reference voltage VR1, and turn off the transistor T2 on the synchronization side. After a given time elapses from turning on the transistor T1 on the main side, the transistor T1 on the main side is turned off and the transistor T2 on the synchronization side may be turned on. When the output voltage Vo becomes lower than the reference voltage VR1 again, the control circuit 12 may turn on the transistor T1 on the main side and turn off the transistor T12 on the synchronization side.

In other words, the control circuit 12 may turn on the transistor T1 on the main side for a given period when the output voltage Vo becomes lower than the reference voltage VR1 and turn off the transistor T1 after a given time elapses. A period in which the transistor T1 on the main side is turned on is assumed to be "on-period", and a period in which the transistor T1 is turned off is assumed to be "off-period." The transistor T2 is controlled so as to turn on and off complementarily with the transistor T1, and may turn off during the "on-period", while turn on during the "off-period."

The current gradient detection circuit 27 detects a negative gradient of a coil current IL that flows through the coil L1 and generates a correction voltage VS according to the detected gradient. The adder circuit 28 adds the correction voltage Vs generated by the current gradient detection circuit 27 to the standard voltage VRO of the standard power supply E1 to generate the above described reference voltage VR1.

The coil current IL that flows through the coil L1 increases when the transistor T1 on the main side is turned on and decreases when the transistor T2 on the main side is turned off. In other words, the waveform of the coil current IL may change with a positive gradient during an on-period and with a negative gradient during an off-period. The change amount of the coil current IL may be a ripple component in the coil current IL, and the ripple component may change in response to turn on and off of the transistor T1 on the main side.

Therefore, the current gradient detection circuit 27 may detect the ripple component of the coil current IL and generate a correction voltage VS according to the ripple component. The coil current IL may decrease gradually when the transistor T1 on the main side is turned off as described above.

The ripple component of the output voltage Vo may be determined mainly by a coil current that flows through the coil L1 and a resistance element (equivalent series resistance (ESR)) due to couple the capacitor C1. In order to reduce a change amount of the output voltage Vo, in other words, to make a ripple component (amplitude) of the output voltage Vo small, a leak current in the capacitor C1 may be made small, in other words, the value of the ESR may be may be made small. For example, a laminated ceramic capacitor has a small ESR compared with that of a conventionally used electro-conductive polymer capacitor. Thus, using a capacitor with a small ESR value such as a laminated ceramic capacitor may reduce the ripple component and thereby stabilize the output voltage Vo.

The comparator 21 of the control circuit 12 compares a feedback voltage VFB that is obtained by dividing the output voltage Vo by the resistors R1 and R2 with the reference voltage VR1. A change amount of the feedback voltage VFB supplied to the comparator 21 is smaller than that of the output voltage Vo and the feed back voltage VFB is a substantially constant voltage. Hence, it is desirable that the reference voltage VR1 be changed. The change amount of the reference voltage VR1 preferably corresponds to the ripple component of the conventional output voltage Vo. According to aspects of the embodiment, the ripple component of the coil current IL is detected and the reference voltage VR1 is increased according to the ripple component. In other words, the current gradient detection circuit 27 detects the ripple component in the coil current IL and may generate a correction voltage VS that gradually increases according to the ripple component.

The adder circuit 28 generates the above described reference voltage VR1 by adding the correction voltage VS generated by the current gradient detection circuit 27 to the standard voltage VR0 of the standard power supply E1. The reference voltage VR1 increases according to the ripple component in the coil current IL during an off-period in which the transistor T1 on the main side is turned off.

The comparator 21 outputs an H level signal Vc1 when the reference voltage VR1 becomes higher than the feedback voltage VFB. The RS-FF circuit 22 outputs an H level signal S1 in response to the signal Vc1 and as a result the transistor T1 on the main side is turned on. When the transistor T1 is turned on, a coil current IL of the coil L1 increases according to a differential voltage between the input voltage V1 and the output voltage Vo. An output voltage Vo is generated that is smoothed by charging and discharging the capacitor C1 according to the coil current IL.

For example, when an output voltage Vo is decreased due to, for example, an abrupt load change, a timing in which the output voltage Vo becomes lower than the reference voltage VR1 advances, and a timing in which an H level signal Vc1 is output advances. In other words, the off-period of the transistor T1 is shortened. On the other hand, when the output voltage Vo rises, a timing in which the output voltage Vo becomes lower than the reference voltage VR1 delays. In other words, the off-period of the transistor T1 may be extended.

Figure 5:
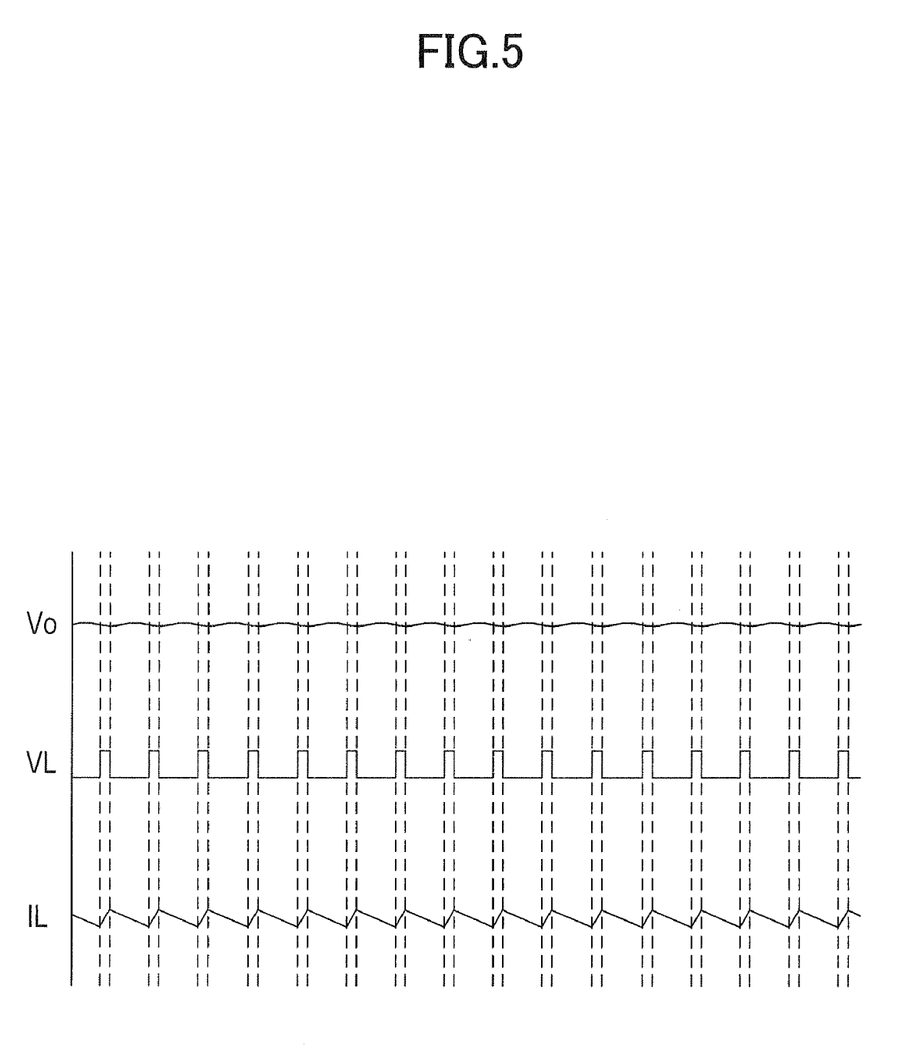
FIG. 5 is a waveform illustrating an operation of the DC-DC converter in FIG. 1.

By the above described operation, a timing in which the transistor T1 is turned on is determined based on the result of comparison between the output voltage Vo and the reference voltage VR1. Therefore, an on-timing (off-time) may be adjusted based on high and low of the output voltage Vo, and a control is applied so that the output voltage Vo may be close to a given voltage (target voltage) based on the standard voltage VR0. In other words, the standard voltage VR0 may be set according to a target voltage that controls the output voltage Vo. For example, under a stable output voltage Vo, a change amount of a coil current IL during an off-period is a substantially constant value. Thus, as illustrated in FIG. 5, the transistors T1 and T2 turn on and off with a stable interval (cycle). Accordingly, the ripple component of the coil current IL may be reduced compared with a conventional DC-DC converter, and thereby the output voltage Vo may be stabilized.

Figure 3:
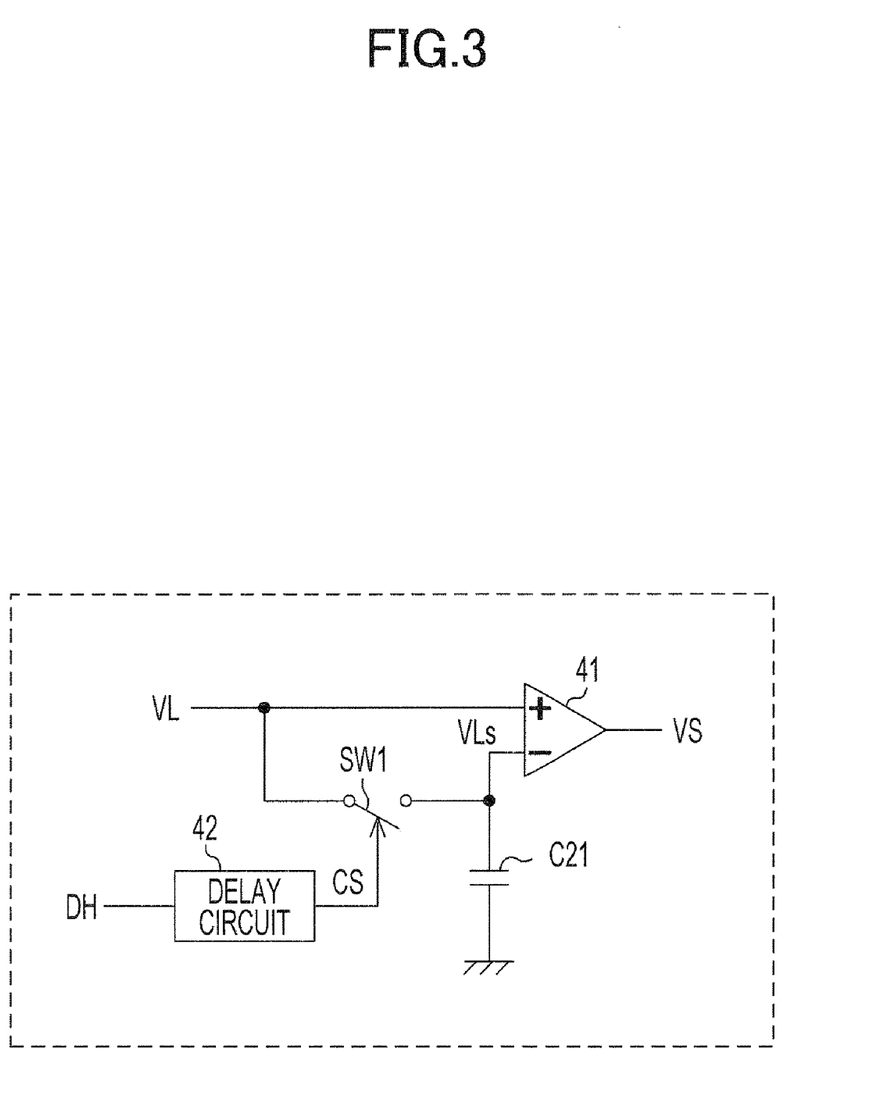
FIG. 3 is a circuit diagram of a current gradient detection circuit in accordance with aspects of the present invention.

Hereunder, aspects of a configuration example of the current gradient detection circuit 27 will be described.

As illustrated in FIG. 3, the current gradient detection circuit 27 may include an operational amplifier 41, a delay circuit 42, a switch SW1, and a capacitor C21.

A non-inverting input terminal of the operational amplifier 41 is coupled to an input side terminal of the coil L1 included in the converter unit 11 illustrated in FIG. 1, in other words, a node between the transistors T11 and T12, and a voltage VL at the node (hereunder, called as a coil voltage) is supplied. A first terminal of the switch SW1 is coupled to the node. A second terminal of the switch SW1 is coupled to an inverting terminal of the operational amplifier 41 and a first terminal of the capacitor C21, and a second terminal of the capacitor C21 is coupled to a ground. A control terminal of the switch SW1 is coupled to the delay circuit 42.

Figure 4:
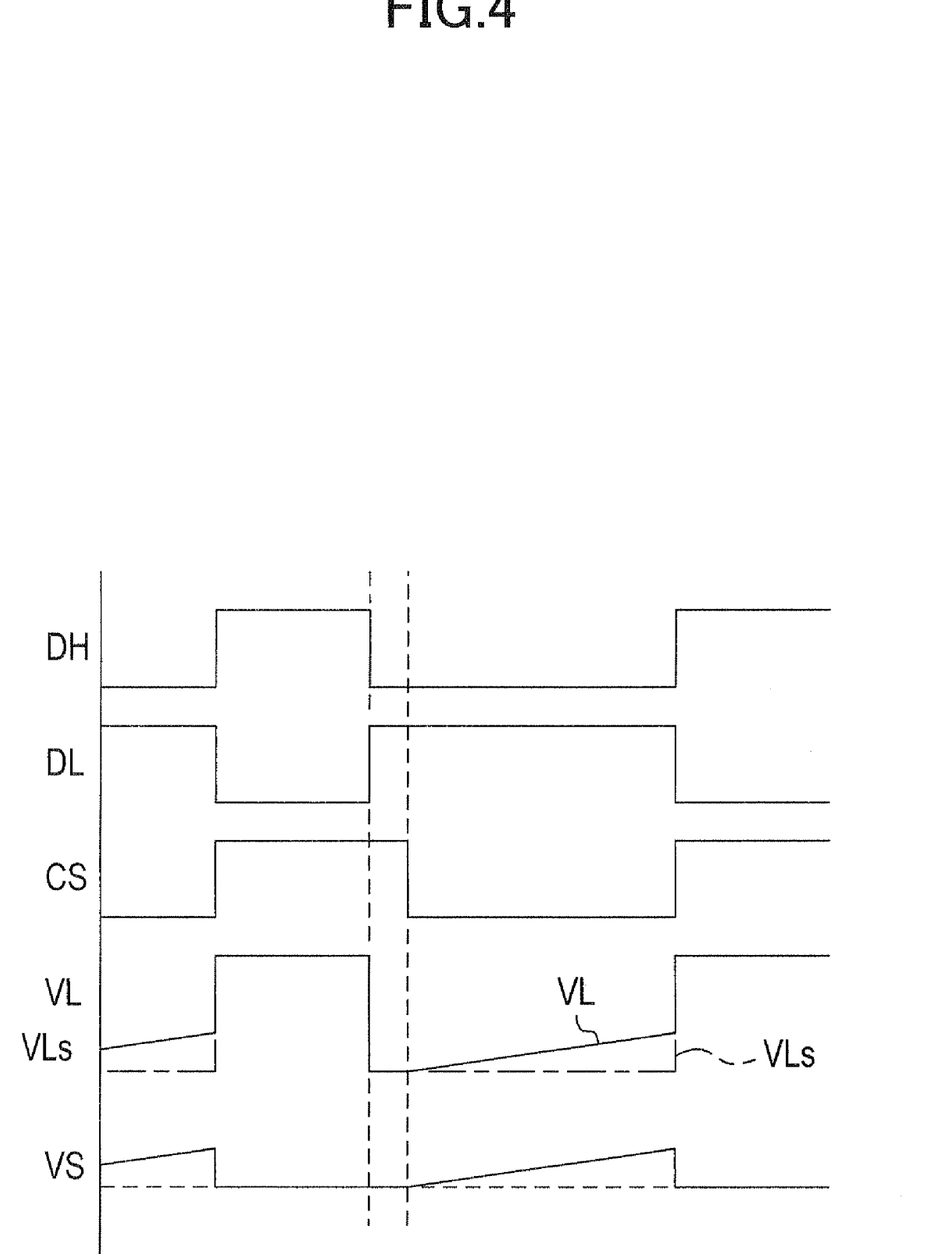
FIG. 4 is a timing chart illustrating an operation of the DC-DC converter in FIG. 1.

A control signal DH for controlling on and off of the transistor T11 on the main side illustrated in FIG. 1 is supplied to the delay circuit 42. As illustrated in FIG. 4, the delay circuit 42 outputs an H level signal CS in response to an H level control signal DH, and outputs an L level signal CS in response to an L level control signal DH after delaying a given time from the L level signal DH. The switch SW1 turns on in response to the H level signal CS and turns off in response to the L level signal.

The coil voltage VL is supplied to both terminals of the operational amplifier 41 when the switch SW1 is turned on. The coil voltage VL is supplied to a first terminal of the capacitor C21. Hence, a voltage of the first terminal of the capacitor C21 may be substantially the same as a voltage of the terminal of the operational amplifier 41.

The coil voltage VL is not supplied to the inverting input terminal of the operational amplifier 41 and the first terminal of the capacitor C21 when the switch SW1 is turned off. Consequently, a voltage of the inverting input terminal of the operational amplifier 41 becomes the terminal voltage of the capacitor C21, in other words, a voltage immediately before the switch SW1 is turned off is held by the capacitor C21. The voltage held by the capacitor C21 is assumed to be a hold voltage VLs.

The above described delay circuit 42 is provided in order to hold a voltage of one of the two input terminals (according to aspects of the embodiment, the inverting input terminal) of the operational amplifier 41 in the capacitor C21 when voltages supplied to the two terminals of the operational amplifier 41 are substantially the same value. As described above, the non-inverting input terminal of the operational amplifier 41 is directly coupled to the input side terminal of the coil L1 illustrated in FIG. 1, and the inverting input terminal of the operational amplifier 41 is coupled to input side terminal of the coil L1 through the switch SW1. The capacitor C21 is coupled to the inverting input terminal of the operational amplifier 41. The coil voltage VL changes according to switching between the transistors T1 and T2. Therefore, there is a period in which voltage levels at both terminals of the operational amplifier 41 are different from each other when the switch SW1 is turned on. Hence, by delaying timing when the switch SW1 is turned off for a given time later than a switching between transistors T1 and T2, the switch SW1 is turned off after voltage levels of the both terminals of the operational amplifier 41 become substantially the same and the voltage is held in the capacitor C21.

In FIG. 1, the coil voltage VL may become a voltage according to an input voltage Vi during the on-period of the transistor T1. The coil voltage VL changes according to a coil current IL by the on resistance of the transistor T2 on the synchronization side during the off period of the transistor T2. The coil current IL decreases during the off-period, and the coil voltage VL rises according to the coil current IL (refer to FIG. 4).

The operational amplifier 41 outputs a voltage that is obtained by amplifying a potential difference of both terminals as a slope voltage VS. The voltage VS corresponds to a potential difference between the coil voltage VL and the hold voltage VLs. In other words, the voltage VS corresponds to a change amount of the coil current IL (ripple component) during the off-period. As illustrated in FIG. 4, the slope voltage VS becomes 0 V (a level indicated by the dotted line) during the on-period, and gradually increases when the switch SW1 is turned off.

As described above, the current gradient detection circuit 27 may detect a ripple component in the coil current IL, and may generate a slope voltage VS according to the detection result. Accordingly, a DC-like increase and decrease in a current at the converter unit 11 by a load (not illustrated) coupled to the output terminal Po may not influence the slope voltage VS. Thus, a stable output voltage Vo may be generated compared with a method that detects an output current.

As described above, according to aspects of the embodiment, the following effects may be achieved.

(1) The current gradient detection circuit 27 may detect only a ripple component in the coil current IL and may generate a slope voltage VS according to the detected result. The adder circuit 28 may generate a reference voltage VR1 by adding a slope voltage VS to a standard voltage VR0. The comparator 21 compares a feedback voltage VFB according to the output voltage Vo with the reference voltage VR1, and may generate a signal VC1 according to the comparison result. The control circuit 12 turns on and off the transistors T1 and T2 of the converter unit 11 based on the signal Vc1. Consequently, the output voltage Vo may be stabilized because the transistors T1 and T2 may turned on and off periodically even for the output voltage Vo with a small ripple.

(2) The current gradient detection circuit 27 may detect only a ripple component in the coil current IL, and may generate a slope voltage VS according to the detected result. Accordingly, a DC like increase and decrease in a current at the converter unit 11 by a load coupled to the output terminal Po may not influence the slope voltage VS. Thus, a stable output voltage Vo may be generated compared with a method that detects an output current.

(3) A resistance value of the ESR due to couple the smoothing capacitor C1 may be made small, thus a laminated ceramic capacitor may be used as the capacitor C1 and miniaturization and cost reduction of the DC-DC converter may be achieved.

Aspects of the above described embodiment may be implemented by the following modes.

In the above described embodiment, the reference voltage VR1 is generated by adding a slope voltage VS according to a ripple component in the coil current IL to the standard voltage VR0 and compares the reference voltage VR1 with a feedback voltage VFB according to the output voltage Vo. In other words, in the output voltage Vo and the standard voltage VRo, the slope voltage is added to the standard voltage VR0 side. Alternatively, the slope voltage may be added to the output voltage Vo side.

Figure 6:
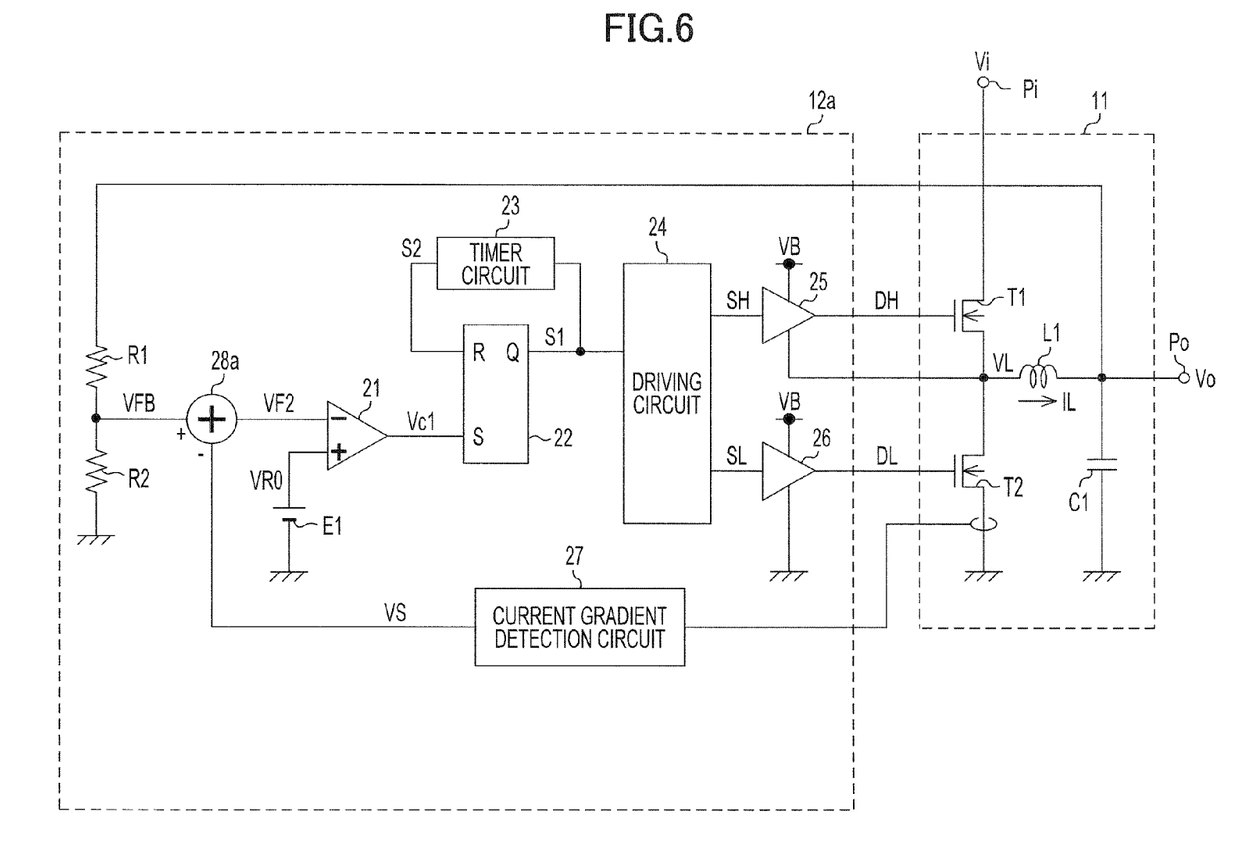
FIG. 6 is a block circuit diagram of an alternative DC-DC converter in accordance with aspects of the present invention.
Figure 7:
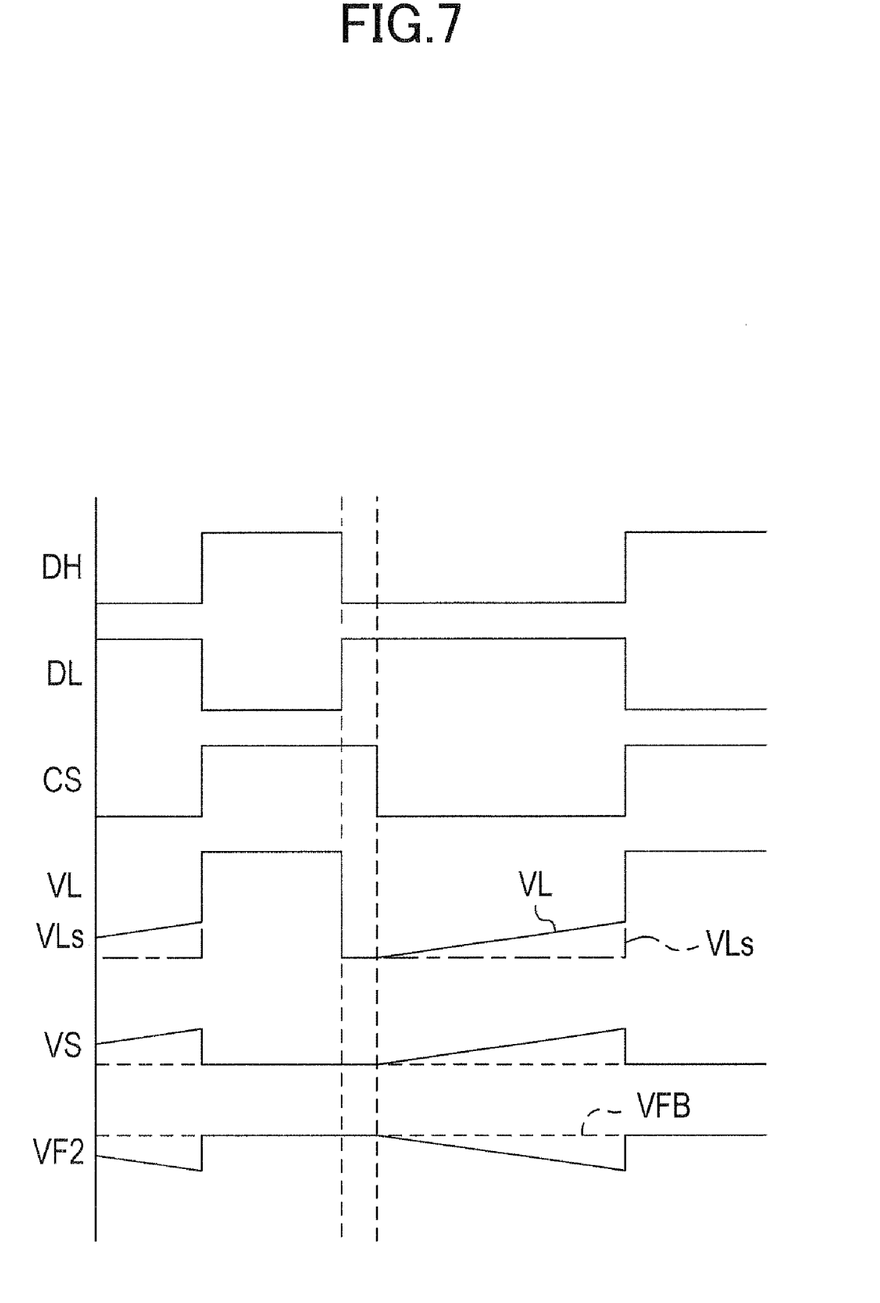
FIG. 7 is a timing chart illustrating an operation of the DC-DC converter in FIG. 6.

For example, as illustrated in FIG. 6, a control circuit 12a may include an adder circuit 28a. A first input terminal of the adder circuit 28a is coupled between the resistors R1 and R2 and to which a feedback voltage VFB is supplied. A second input terminal of the adder circuit 28a is coupled to the current gradient detection circuit 27 and the slope voltage VS is supplied. The adder circuit 28a adds a voltage that is obtained by inverting a voltage supplied to the second input terminal to the voltage supplied to the first input terminal, in other words, a feedback voltage VF2 is generated by subtracting the slope voltage VS from the feedback voltage VFB as illustrated in FIG. 7. The comparator 21 compares the feedback voltage VF2 output from the adder circuit 28a with the standard voltage VRO (reference voltage) supplied from the standard power supply E1 and outputs a signal Vc1 according to the comparison result. The DC-DC converter configured by the above described manner may achieve substantially the same effects as the above descried embodiment.

In the above embodiment, the timer circuit 23 is configured so as to output an H level pulse signal S2 after a given time elapses from the rising timing of the signal S1 depending on the input voltage Vi and the output voltage Vo. The configuration of the timer circuit 23 may be appropriately changed.

For example, the timer circuit 23 may be configured so as to output a signal S2 after a fixed time elapses. Alternatively, the timer circuit 23 may be configured so as to output the signal S2 by timing depending only on the input voltage Vi.

According to aspects of the above embodiment, MOS transistors are disclosed as examples of the switch circuit and the second switch circuit; however, bipolar transistors may be used. Moreover, a switch circuit that includes a plurality of transistors may be used.

According to aspects of the above embodiment, the coil voltage VL changes according to the coil current IL by the on resistance of the transistor T2 on the synchronization side. Hence, a configuration of the switch on the synchronization side may be appropriately changed if the coil voltage VL may be changed according to the coil current IL. For example, a serial circuit of a resistor and a diode may be coupled instead of the transistor T2.

According to aspects of the above embodiment, the control signal DH is supplied to the delay circuit 42 illustrated in FIG. 3, any signal that corresponds to the on-period or off-period of the transistor T1 may be supplied, and the signals SH and S1 illustrated in FIG. 1 may be supplied to the delay circuit 42. Furthermore, the signals DH and SH for turning on and off the transistor T2 may be logically inverted and be supplied to the delay circuit 42, or the signals DH and SH may be supplied to the delay circuit 42 and the signals may be logically inverted in the delay circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although aspects of the embodiments) of the present inventions have been described in detail, it should be understood that the various changes, substitutions, and alterations could be made hereto without departing from the spirit and scope of the invention.

What is claimed is:

1. A power supply device, comprising:
   a converter unit that includes a switch circuit to which an input voltage is supplied and a coil that is coupled between the switch circuit and an output end from which an output voltage is output; and
   a control circuit configured to perform a comparison between a feedback voltage and a reference voltage, and on/off controls of the switch circuit according to a result of the comparison;

wherein, the control circuit includes
a current gradient detection circuit configured to perform detection of a gradient of a coil current that flows thorough the coil during an off period of the switch circuit and generates a slope voltage according to a result of the detection; and
an adder circuit configured to generate the reference voltage by adding the slope voltage to a standard voltage.

2. The power supply device according to claim 1, wherein, the converter unit includes a second switch that is coupled to a node between the switch circuit and the coil;
the control circuit is configured to control the switch circuit and the second switch circuit complementarily;
the coil current flows through the coil through the second switch circuit that is turned on; and
the current gradient detection circuit is configured to detect a gradient of the coil current based on a voltage of the node.

3. A power supply device, comprising:
a converter unit that includes a switch circuit to which an input voltage is supplied and a coil that is coupled between the switch circuit and an output end from which an output voltage is output, and
a control circuit configured to perform a comparison between a feedback voltage and a reference voltage, and on/off controls of the switch circuit according to a result of the comparison;
wherein, the control circuit includes a current gradient detection circuit configured to perform detection of a gradient of a coil current that flows thorough the coil during an off period of the switch circuit and generates a slope voltage according to a result of the detection; and
an adder circuit configured to perform one of generating the feedback voltage by adding the slope voltage to a voltage according to the output voltage and generating the reference voltage by adding the slope voltage to a standard voltage that is set according to the output voltage,
wherein the converter unit includes: a serial circuit comprising a diode and a resistor that are coupled between a node of the switch circuit and the coil, and a power line;
the coil current flows through the coil during an off period of the switch circuit through the diode and the resistor; and
the current gradient detection circuit is configured to detect a gradient of the coil current based on the node voltage.

4. A power supply device, comprising:
a converter unit that includes a switch circuit to which an input voltage is supplied and a coil that is coupled between the switch circuit and an output end from which an output voltage is output; and
a control circuit configured perform a comparison between a feedback voltage and a reference voltage, and on/off controls of the switch circuit according to a result of the comparison;
wherein, the control circuit includes a current gradient detection circuit configured to perform detection of a gradient of a coil current that flows thorough the coil during an off period of the switch circuit and generates a slope voltage according to a result of the detection; and
an adder circuit configured to perform one of generating the feedback voltage by adding the slope voltage to a voltage according to the output voltage and generating the reference voltage by adding the slope voltage to a standard voltage that is set according to the output voltage,
wherein the current gradient detection circuit includes:
an operational amplifier having a first input terminal coupled to a node between the switch circuit and the coil and a second input terminal coupled to the node through a switch, wherein the operational amplifier is configured to generate the slope voltage according to a differential voltage between the first input terminal and the second input terminal; and
a capacitor that is coupled to the second input terminal; and
wherein the switch is configured to turn on and off according to the on period and off period of the switch circuit.

5. A control method, comprising:
performing a comparison between a feedback voltage according to an output voltage and a reference voltage;
performing on/off controls of a switch circuit to which an input voltage is supplied based on a result of the comparison;
detecting a gradient of a coil current that flows through a coil coupled between the switch circuit and an output end from which the output voltage is output;
generating a slope voltage according to a result of the detecting; and
generating the reference voltage by adding the slope voltage to a standard voltage.

6. A power supply device, comprising:
a converter unit that includes a switch circuit to which an input voltage is supplied and a coil that is coupled between the switch circuit and an output end from which an output voltage is output; and
a control circuit configured to perform on/off controls of the switch circuit according to a result of the comparison;
wherein, the control circuit includes:
a current gradient detection circuit configured to perform detection of a gradient of a coil current that flows thorough the coil during an off period of the switch circuit and generates a slope voltage according to a result of the detection;
an adder circuit configured to receive the output voltage without going through an amplifier and perform generating a feedback voltage by adding the slope voltage to a voltage according to the output voltage; and
a comparator configured to perform a comparison between the feedback voltage and a reference voltage.

7. The power supply device according to claim 6, wherein the current gradient detection circuit includes:
an operational amplifier having a first input terminal coupled to a node between the switch circuit and the coil and a second input terminal coupled to the node through a switch, wherein the operational amplifier is configured to generate the slope voltage according to a differential voltage between the first input terminal and the second input terminal; and
a capacitor that is coupled to the second input terminal; and
wherein the switch is configured to turn on and off according to the on period and off period of the switch circuit.

* * * * *